(No Model.) 2 Sheets—Sheet 1.

B. F. WRIGHT.
TARGET TRAP.

No. 534,488. Patented Feb. 19, 1895.

Witnesses—
Frank S. Davis
Emma Lyford

Inventor—
Benjamin F. Wright
By Geo. P. Munray
Atty (No Model.) 2 Sheets—Sheet 2.

B. F. WRIGHT.
TARGET TRAP.

No. 534,488. Patented Feb. 19, 1895.

Witnesses:
Frank S. Davis
Emma Lyford

Inventor:
Benjamin F. Wright
By Geo. J. Murray
Atty.

UNITED STATES PATENT OFFICE.

BENJAMIN F. WRIGHT, OF HARTWELL, OHIO.

TARGET-TRAP.

SPECIFICATION forming part of Letters Patent No. 534,488, dated February 19, 1895.

Application filed August 8, 1893. Serial No. 482,679. (No model.)

*To all whom it may concern:*

Be it known that I, BENJAMIN F. WRIGHT, a citizen of the United States, and a resident of Hartwell, in the county of Hamilton and State of Ohio, have invented certain new and useful Improvements in Target-Traps, of which the following is a specification.

The object of my invention is to provide an attachment for target traps, by which the pivoted standard which carries the throwing arm may be adjusted radially, and set to throw the target in different directions, the setting notches being automatically closed after the target is thrown in one direction, and the setting detent withdrawn from the notch to set the arm to throw in a different direction. The operator will not, therefore, by mistake set the trap to throw twice in the same direction until all the targets, usually five in number, have been thrown.

It is usual, in sporting contests with flying targets such as this trap is intended to throw, to have five traps, each set to throw the target at a different angle from the trap and to test the skill of the sportsman, who is not supposed to know which trap is to be sprung, the trap and operator being concealed from the marksman, and each marksman having five shots.

In traps heretofore used, provision has been made for adjusting the trap to different angles, but no means provided for closing the notches in the rack, so that the operator was uncertain at what angle he had thrown the second or third target. By my arrangement, the notches are automatically closed as soon as the setting arm is lifted to pass from one notch to the other.

I will first describe my invention in connection with the accompanying drawings, in which like parts are indicated by similar reference letters wherever they occur throughout the various views, and then particularly point out and describe the novel features in the appended claims.

Figure 1:
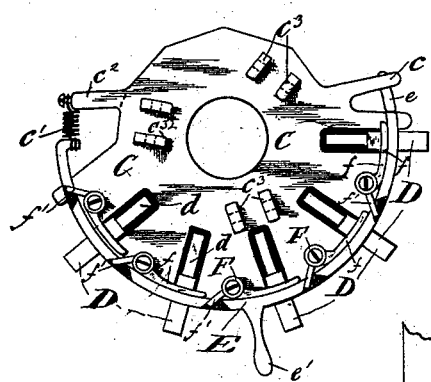
Figure 2:
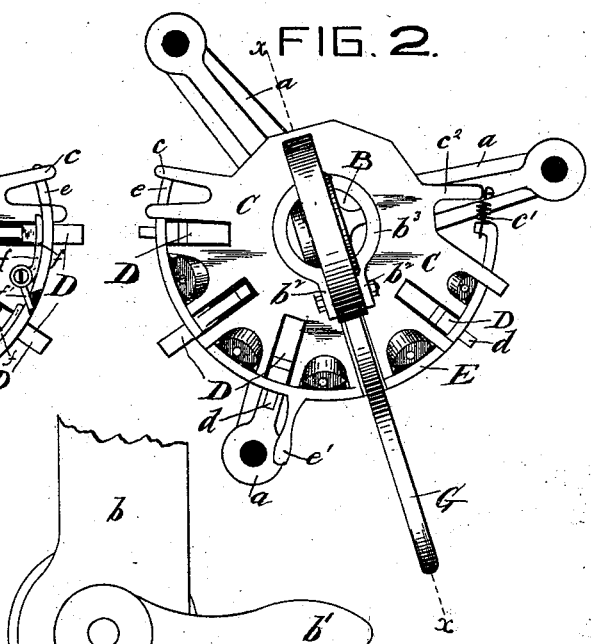
Figure 3:
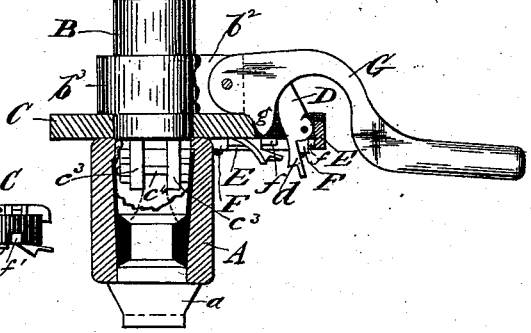
Figure 4:
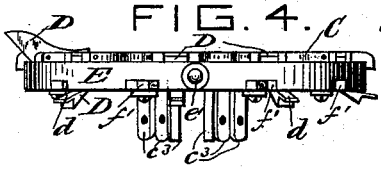
Figure 5:
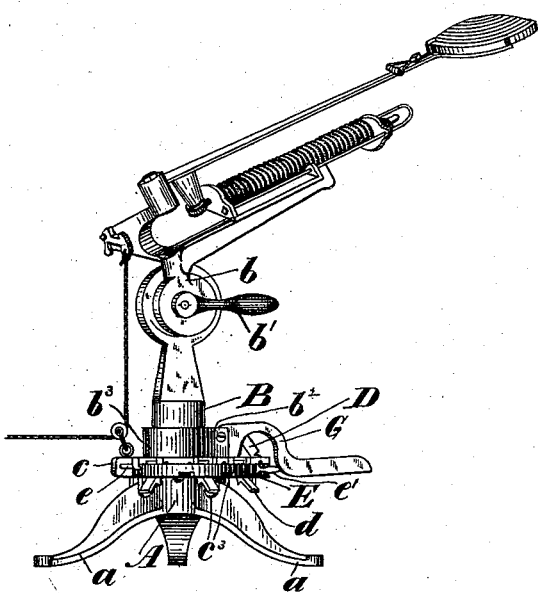

Referring to the drawings: Figure 1 is an inverted plan view of my trap attachment. Fig. 2 is a top plan view of the same, applied to the customary stand or tripod. Fig. 3 is a vertical section taken through line $xx$ of Fig. 2, the standard being shown in elevation with parts broken away to expose the parts back of them. Fig. 4 is an edge elevation of the plate with one of the registering triggers thrown up, to be acted upon by the detent of the locking pawl, while the others are shown in the closed position, as indicated in Fig. 2. Fig. 5 is a side elevation illustrating a trap of ordinary construction with my improvements attached, the throwing arm and spring for throwing it in set position.

Referring to the parts, A represents the body of the tripod, which is perforated to receive the standard B, the body being supported upon three legs $a$.

$b$ represents the lower section of the support for the throwing arm and $b'$ the tail nut by which the throwing arm is adjusted around the horizontal axis.

The tripod and standard B, with the upper joints, and other portions which are connected to it (and which are not shown) does not differ, except as hereinafter described, from the standard now commonly employed in this class of traps, and need not, therefore, be more specifically described.

My attachment consists of the plate C, which is radially slotted to receive the registering triggers D, the triggers being pivoted in the outer ends of the slots and adapted to be held in either the open or closed position by gravity when thrown beyond the vertical line upon either side of the pivot.

E is a segmental ring fitted to slide around the edge of the plate C. Its end $e$ is rounded to pass through a perforation in the arm $c$, which extends radially from the plate C. Its opposite end is hooked to receive one end of a coiled spring $c'$, the opposite end of the spring being connected to a radial arm $c^2$ of the plate C, by which the ring is normally held in the position shown in Figs. 1 and 2. The notched portions of the plate C extend over the upper edge of the ring E to serve as top guides.

F are pivoted levers, which are secured underneath the plate C, the long arms $f$ of which lie concentrically with the ring E, while the short arms $f'$ extend through notches in the lower edge of said segment E. When the triggers, D, close the slots in the plate, C, the arms, $d$, of the triggers extend in the path traversed by the long arms, $f$, of the levers, F.

The segment E has a handle $e'$, by which the ring is slipped around the edge of the plate C against the tension of the spring $c'$, for the purpose of actuating the levers F and throwing the triggers D out of the notches in the plate C and beyond the vertical line of their pivot pins, as seen at the left hand side of Fig. 4. This movement throws the arms, $d$, of the triggers into the notches, and when the detent of the arm, G, is brought down upon the arm $d$, the triggers, D, will be thrown in against the arm, G, as seen clearly in Fig. 4, and when the arm is lifted to withdraw the detent, $g$, from the notch, the trigger, D, will fall into the notch and close it so that the detent will not again be brought down into the notch until the trigger, D, is thrown again to the position shown upon the left hand side of Fig. 4. The short arms $f'$ of the levers F sustain the segment E and serve as its lower guides.

From the under side of the plate C project downwardly perforated lugs $c^3$, which pass upon each side of the legs $a$, and bolts $c^4$, passing through the lugs and the upper web of the leg, secures the attachment in place upon the tripod.

The lever arm G is pivoted between lugs $b^2$, which are preferably formed integral with the standard B, but when the device is to be applied to the standards in common use, the collar $b^3$ may be made in strap form and fastened around the standard B.

The operation of the device is as follows: The lever arm G being thrown up to a vertical position, the ring E is drawn around against the tension of the spring by which movement the levers F are actuated, to throw the triggers D out of the notches in the plate C, and into the position shown at the left of Fig. 4. The target being placed in the trap, the detent of the arm G is brought down into any of the notches desired, and in bringing it down, the detent $g$ strikes upon the arm $d$ of the trigger D while entering the notch, and throws the parts into the position shown in Fig. 3. The trap is then sprung to throw one target. The lever arm G is then thrown up to remove the detent $g$ from the notch in plate C, and as it is withdrawn, the trigger D drops into the notch, closing it, so that the operator knows that a target has been thrown while the trap is adjusted in that position. The standard B is then turned around to bring the detent $g$ over one of the uncovered notches in the plate C, and again brought down to retain the throwing arm and standard in its new position. This operation is continued until five targets have been thrown, each to a different point of the compass, and the arm G is thrown up and the triggers thrown outwardly, preparatory to setting the trap for the next marksman.

It will be seen that but one trap is necessary for the practice usually requiring five, and the operator is not required to move from his position to supply the trap with targets as he would have to do were five traps employed.

What I claim as new, and desire to secure by Letters Patent, is—

1. In a target trap, the combination of the base or fixed stand, the notched plate thereon, the gravitating triggers to close or open notches in said plate, pivoted levers on the under side of the plate to engage said triggers, the notched ring movable around the edge of the plate to simultaneously throw the triggers outwardly and open the notches, a standard carrying the throwing arm, fitted to turn in the said plate and fixed standard, and a lever arm pivoted to said standard and having a detent adapted to be brought into the open notch and throw the trigger into position to drop by gravity and close the notch when the said detent is withdrawn, substantially as shown and described.

2. The combination, substantially as specified, of the base A, $a$, the notched plate C secured thereon, the stand B pivoted to turn in said base and having a collar $b^3$, the lugs $b'$, the lever arm G having detent $g$ for turning the standard and bringing its detent vertically above the notches in the plate, the triggers D having arms $d$ journaled in said notches, the levers F having arms $f$ to engage the arms of the triggers and arms $f'$ projecting through notches in the sliding ring E, the ring E fitted to slide around the edge of the plate and actuate the triggers to throw them outwardly, and uncover the notches in plate C.

3. In a target trap, the combination of the fixed stand having at its upper end a notched plate or disk, pivoted triggers to uncover and close said notches, means to throw said triggers to simultaneously uncover the notches, the throwing arm standard fitted to turn in the fixed stand and a lever arm pivoted to the throwing standard and having a detent adapted to be brought into any one of the notches and trip the trigger, so that when the detent is withdrawn, said trigger will fall into and close the notch, substantially as shown and described.

BENJAMIN F. WRIGHT.

Witnesses:
 FRANK S. DAVIS,
 GEO. J. MURRAY.